Dec. 31, 1929.     O. J. KUKER     1,741,422
HAND LEVEL
Filed Dec. 22, 1927
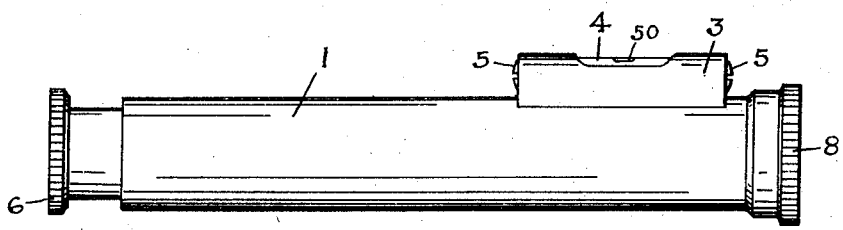
Fig. 1.
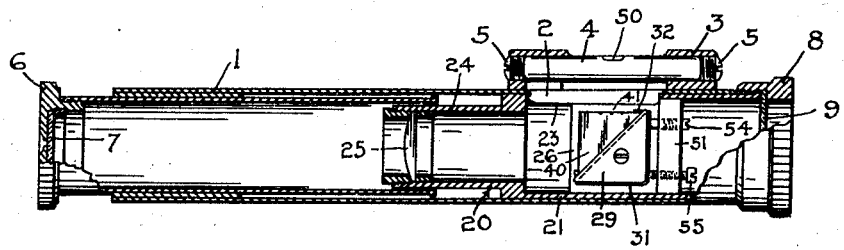
Fig. 2.
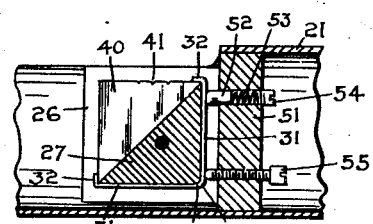
Fig. 4.
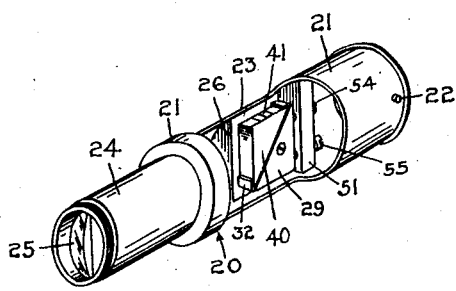
Fig. 3.
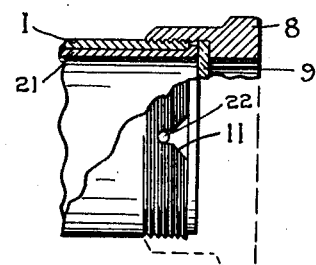
Fig. 5.
Fig. 6.
INVENTOR
Otto J. Kuker
BY J. L. Rivers,
ATTORNEY Patented Dec. 31, 1929

1,741,422

UNITED STATES PATENT OFFICE

OTTO J. KUKER, OF SEATTLE, WASHINGTON

HAND LEVEL

Application filed December 22, 1927. Serial No. 241,763.

The objects of my invention, generally stated, are, to provide in a hand level a detachable member which carries, with other instrumentalities, a half lens and a prism, said member making it convenient for inspecting or cleaning the lens or prism, without interfering with the adjustment of the prism; to afford, in such a device, a prism, having an indicator thereon, and a spring clip for detachably securing the prism in place; and, to furnish means for transversely adjusting the prism to bring it into parallel relation with the bubble tube.

Other objects may appear as the description of the invention progresses.

In the accompanying drawing—

Figure 1 is a side elevation of the device complete, the eye piece being indicated as telescopically connected with the barrel;

Fig. 2, a longitudinal section of the same, end portions being indicated as broken away;

Fig. 3, a perspective of said detachable member;

Fig. 4, a detail section of said member particularly designed to illustrate the mounting of the prism, and the prism adjusting mechanism;

Fig. 5, an enlarged view in sectional elevation, including one end of the barrel and an end piece threadedly secured thereto, also indicating a pin projecting from the detachable member and its engagement with the barrel, to prevent rotation of the member when it is in operative position within the barrel; and, Fig. 6, a view, taken through the eye piece, showing the reflection of the bubble when centered with the indicator on the prism.

Referring more particularly to the drawing, the barrel of the device, denoted as 1, is provided with an aperture 2, the same being surmounted by a bubble tube casing 3, in which the bubble tube 4 is secured by the screws 5, threadedly engaged with the casing. An eye piece 6, enclosed at its outer end by a section of clear glass 7, is slidably secured in one end of the barrel, and an end piece 8, likewise enclosed by a section of clear glass 9, is threadedly mounted to the other end of the barrel, said portions being designed to exclude dust, or the like, from the instrument. The barrel is also provided at its threaded end with a notch 11, as indicated in Fig. 5.

A detachable member, tubular in form and generally designated as 20, Fig. 3, is mounted in the barrel, its body portion 21 being adapted to closely fit but slidably engage the barrel, the pin 22, engageable with the notch 11, securing the member in place. 23 denotes a cut-out section in the body portion, 24 an end of the member, reduced in diameter, and 25 a half lens mounted in said end. A seat 26 for a prism, secured within the cut-out portion, is on one side conformable to the inner periphery of the portion and flat on the other side. A block 27 is pivotally mounted to said seat, the same having flat sides, and while substantially triangular in outline is preferably rounded slightly at its apex, as at 28, Fig. 4. In the present embodiment of the invention, the block carries a top plate 29, which slightly overhangs its sides and base, affording means for preventing lateral displacement of a clip adapted to embrace the block.

Said clip, bent from a single piece of flat resilient stock, comprises a bight portion 30, a pair of arms 31 extending from the bight portion and at substantially right angles to each other, and each terminating at its free end in a right angular portion 32 adapted to grip opposite corners of a prism carried by the block.

The prism 40, being triangular in form, is provided on one edge with an indicator 41, consisting of a straight line disposed in right angular relation with the sides of the prism, said prism being mounted to the block, as indicated in Fig. 3, by forcing said corners of the prism under the portions 32 of the clip. The corners referred to represent the most fragile portions of the prism, and heretofore in hand levels the means for detachably securing prisms of similar form in place have been more or less rigid, with the result, that if the instrument were handled roughly said corners would become chipped or broken. This clip, while positively holding the prism in operative position, also provides flexible connections for the prism with the block, which, through their yielding nature, lessen the hazard of breakage.

The means through which the prism is adjusted relative to the bubble tube and the bubble 50 therein, consist of a support 51, fixedly secured within said detachable member. The support is provided with a bore-like opening, in which is slidably mounted a pin 52 designed to operate against the adjacent portion of said clip, as indicated in Fig. 4, the pin being put under tension by the coiled spring 53, and the parts thus assembled held in place by the screw 54. The screw 55, threadedly engaged with the support 51 and also operating against the clip, affords the direct means whereby the prism, secured to the pivotally mounted block as described, may be tilted and thereby adjusted to proper position in respect to the bubble tube and the bubble therein. As is evident, said last-named pin, by virtue of its mounting, will cooperate with the adjusting screw in maintaining the prism in such adjusted position.

When the device is completely assembled, the end piece 8 encloses the notch 11 and pin 22, thereby giving the instrument a finished appearance at the end to which it is applied, and also serving through its interior shoulder to prevent forward movement of said detachable member within the barrel.

In operating the device, the detachable member having been first slid into the barrel and secured in place through said pin and notch, the prism is adjusted as described so that when the instrument is in a level position the reflection of the bubble on the prism will center with the indicator thereon, said end piece is put in place, and the device is ready for use. The position of the bubble relative to the indicator, either for the purpose of adjusting the prism or in actual use of the instrument is ascertained, as is evident, by looking through the eye piece. In Fig. 6 the bubble is shown as thus centered, indicating the device to be in proper position for taking observations through the field of vision, represented by the blank space shown in said figure.

The distinctive features of this invention are to be found in the detachable member which permits the prism and the half lens, as a unit, to be quickly removed from the barrel, for cleaning or other purposes, without disturbing the adjustment of the prism; in the clip, which affords flexible connections for the prism with the block to which it is mounted, providing easy means for installing or removing the prism, as well as protection to the prism against injury; and, in the prism, having the indicator, and the means for its transverse adjustment, which, so far as known to me present, in a hand level, parts and arrangements thereof which are new and permit it to function in a more facile way.

As will be obvious to those skilled in the art, changes in and modifications of the construction described may be made without departing from the spirit of my invention or sacrificing its advantages, hence it is desired that I be not confined to the specific structure set forth.

I claim:

1. In a hand level having a hollow body for viewing objects therethrough, an aperture in the body, and a bubble tube surmounting the aperture, a detachable member mounted in the body, said member carrying a support for a prism pivotally mounted, a prism flexibly secured in the support, an indicator on the prism located opposite the bubble tube, means bearing on the support for tiltably adjusting the prism relative to the tube, and a half lens spaced away from the prism.

2. In a hand level, a detachable member carrying a prism, means located in said member for adjusting the prism to bring it into operative position relative to the bubble tube, and a lens disposed in said member and in spaced relation with the prism.

3. In a hand level having a prism provided with angular edge portions and a support for the prism having a pair of edge sections disposed substantially in right angular relation, a clip for securing the prism to the support, made of a single piece of flat resilient stock, comprising a bight portion, a pair of arms extending from the bight portion, adapted to embrace said edge sections of the support, each arm terminating at its free end in an inturned portion, adapted to grip angular edge portions of the prism.

4. In a hand level having a prism provided with angular end portions oppositely disposed and a support for the prism, a clip provided with divergent arms for embracing the support, each arm terminating in an inturned portion, adapted to grip said end portions of the prism, and provide flexible connections therefor.

5. In a hand level having a barrel for viewing objects therethrough, a cut-out section in the barrel, and a bubble tube associated with said section, a detachable member, slidably mounted in the barrel, having a cut-out section disposed oppositely of the first-named section, a support for a prism pivotally mounted in the last-named section, a prism flexibly connected with said support, indicating means on the prism, operatively disposed relative to the bubble tube, means for adjusting said support whereby the position of the prism may be varied transversely of the member, and a half lens mounted in the member in operative relation to the prism.

6. In a hand level having a barrel for viewing objects therethrough and a bubble tube operatively connected with the barrel, a tubular member, slidably mounted in the barrel, means for detachably securing the member in operative position within the barrel, a cut-out section in the member, a support pivotally mounted in said section, a flexible clip detachably secured to the support, a prism seated on the support and retained by said clip, adapted to receive a reflection of the bubble in said tube, an indicator on the prism for designating the position of said bubble, means for adjusting said support whereby the position of the prism may be varied, and a half lens mounted in the member and spaced away from the prism.

OTTO J. KUKER.